US010254505B2

(12) United States Patent
Hu et al.

(10) Patent No.: US 10,254,505 B2
(45) Date of Patent: Apr. 9, 2019

(54) ELECTROMAGNETIC DRIVING MODULE AND CAMERA DEVICE USING THE SAME

(71) Applicant: TDK TAIWAN CORP., Yangmei Taoyuan (TW)

(72) Inventors: Chao-Chang Hu, Yangmei Taoyuan (TW); Cheng-Kai Yu, Yangmei Taoyuan (TW)

(73) Assignee: TDK TAIWAN CORP., Yangmei Taoyuan (TW)

( * ) Notice: Subject to any disclaimer, the term of this patent is extended or adjusted under 35 U.S.C. 154(b) by 58 days.

(21) Appl. No.: 15/363,688

(22) Filed: Nov. 29, 2016

(65) Prior Publication Data

US 2017/0168258 A1    Jun. 15, 2017

Related U.S. Application Data

(60) Provisional application No. 62/266,160, filed on Dec. 11, 2015.

(30) Foreign Application Priority Data

May 17, 2016 (TW) .............................. 105115128 A

(51) Int. Cl.
*G02B 7/08*    (2006.01)

(52) U.S. Cl.
CPC ...................................... *G02B 7/08* (2013.01)

(58) Field of Classification Search
CPC ... G02B 7/08; G02B 7/002; G02B 7/02–7/16; G02B 7/025
USPC .................................. 359/703–704, 811–830
See application file for complete search history.

(56) References Cited

U.S. PATENT DOCUMENTS

2013/0050828 A1*    2/2013    Sato ....................... G02B 27/64
                                                            359/557

* cited by examiner

*Primary Examiner* — Kristina M Deherrera
(74) *Attorney, Agent, or Firm* — Muncy, Geissler, Olds & Lowe, P.C.

(57) ABSTRACT

An electromagnetic driving device is provided, which includes a movable member, a stationary member, a suspension member, and an energy-absorbing glue. The movable member and the stationary member are arranged along a main axis. The suspension member extends along a direction parallel to the main axis, and the two ends thereof are respectively connected to the movable member and the stationary member so as to enable the movable member to be suspended over the stationary member. A segment of the suspension member is covered in the energy-absorbing glue, and the energy-absorbing glue connects the suspension member to the movable member.

12 Claims, 9 Drawing Sheets

ELECTROMAGNETIC DRIVING MODULE AND CAMERA DEVICE USING THE SAME

CROSS REFERENCE TO RELATED APPLICATIONS

This Application claims priority of Taiwan Patent Application No. 105115128, filed on May 17, 2016, and U.S. Provisional Patent Application No. 62/266,160, filed on Dec. 11, 2015, the entirety of which is incorporated by reference herein.

BACKGROUND

Field of the Invention

The present invention relates to a driving module and a camera device using the same, and more particularly to an electromagnetic driving module which converts electrical energy into mechanical energy, and a camera device using the same.

Description of the Related Art

Some electronic devices are equipped with a driving module to drive an element to move a predetermined distance. For example, a camera device usually includes a driving module to generate driving power. One or more optical lens units of the camera device are driven by the driving power to move along a direction perpendicular to an optical axis, so as to facilitate image stabilization.

The driving module includes a stationary member and a movable member moveable relative to the stationary member for supporting the lens assembly. In order to improve the stability and reliability of the driving module, an energy-absorbing glue is applied to a particular region between the movable member and the stationary member. However, as vibration occurs, a drawing force generated between the movable member and the stationary member may fracture the energy-absorbing glue, which causes image quality to degrade because the driving module cannot be operated as desired.

SUMMARY

In order to address the drawbacks in the prior art, one objective of the disclosure is to provide an electromagnetic driving module to stably drive the movement of an element (such as a lens assembly) in an electrical device.

In accordance with some embodiments of the disclosure, the driving assembly includes a movable member, a stationary member, a suspension member, and an energy-absorbing glue. The movable member and the stationary member are arranged along a main axis. The movable member includes an engaging surface parallel to the main axis. The suspension member extends along a direction parallel to the main axis, and the two ends thereof are respectively connected to the movable member and the stationary member so as to enable the movable member to be suspended over the stationary member. A segment of the suspension member is covered in the energy-absorbing glue, and the energy-absorbing glue connects the suspension member to the movable member.

In the above-mentioned embodiments, the movable member further includes at least one flange formed on the engaging surface, and the energy-absorbing glue connects the suspension member to the flange. Alternatively, the movable member includes two flanges formed on the engaging surface and extending in a direction that is perpendicular to the engaging surface. The energy-absorbing glue is located between the two flanges and connects the suspension member to the two flanges.

In the above-mentioned embodiments, a passage is defined by each flange to allow the suspension member to pass therethrough, wherein a portion of the energy-absorbing glue is disposed in the passage. Specifically, the energy-absorbing glue has a first segment and a second segment, and the second segment is disposed in the notch. The movable member has an upper surface and a lower surface which are perpendicular to the main axis. The second segment is closer to the upper surface or the lower surface than the first segment, and the width of the second segment is smaller than the width of the first segment.

In the above-mentioned embodiments, the movable member is an auto-focusing assembly and includes: a frame, a holder, a focusing driving coil, and a magnet. The engaging surface is located at the side of the frame that is away from the main axis. The holder is surrounded by the frame. The focusing driving coil is disposed on the outer surface of the holder that faces the frame. The magnet is disposed on the frame and faces the focusing driving coil.

In the above-mentioned embodiments, the frame surrounds the main axis and includes a number of lateral frame members and a number of connecting frame members. Each of the connecting frame members connects two neighboring lateral frame members. The engaging surface is located on one of the lateral frame members, and the engaging surface forms and angle with the extending direction of the neighboring lateral frame member.

In the above-mentioned embodiments, the electromagnetic driving assembly further includes an OIS driving coil and a magnet. The magnet is disposed on the movable member and faces the OIS driving coil. The movable member is driven to move in a direction that is perpendicular to the main axis by the magnetic force produced by the OIS driving coil and the magnet.

In the above-mentioned embodiments, the energy-absorbing glue is a viscoelastic body made of materials that include silicon mixing with other mixture.

In the above-mentioned embodiments, the suspension member has an upper reference point and a lower reference point, a segment of the suspension member between the upper reference point and the lower reference point is covered by the energy-absorbing glue. The distance between the lower reference point and a lower surface of the movable member is greater than the distance between the lower reference point and an upper surface of the movable member.

Another objective of the disclosure is to provide a camera device including the driving assembly in any one of the above-mentioned embodiments. The camera device further includes a lens assembly positioned on the movable member of the driving assembly. The optical axis of the lens assembly is aligned with the main axis.

BRIEF DESCRIPTION OF THE DRAWINGS

For a more complete understanding of the embodiments and the advantages thereof, reference is now made to the following descriptions taken in conjunction with the accompanying drawings.

DESCRIPTION OF THE ILLUSTRATIVE EMBODIMENTS

Figure 1:
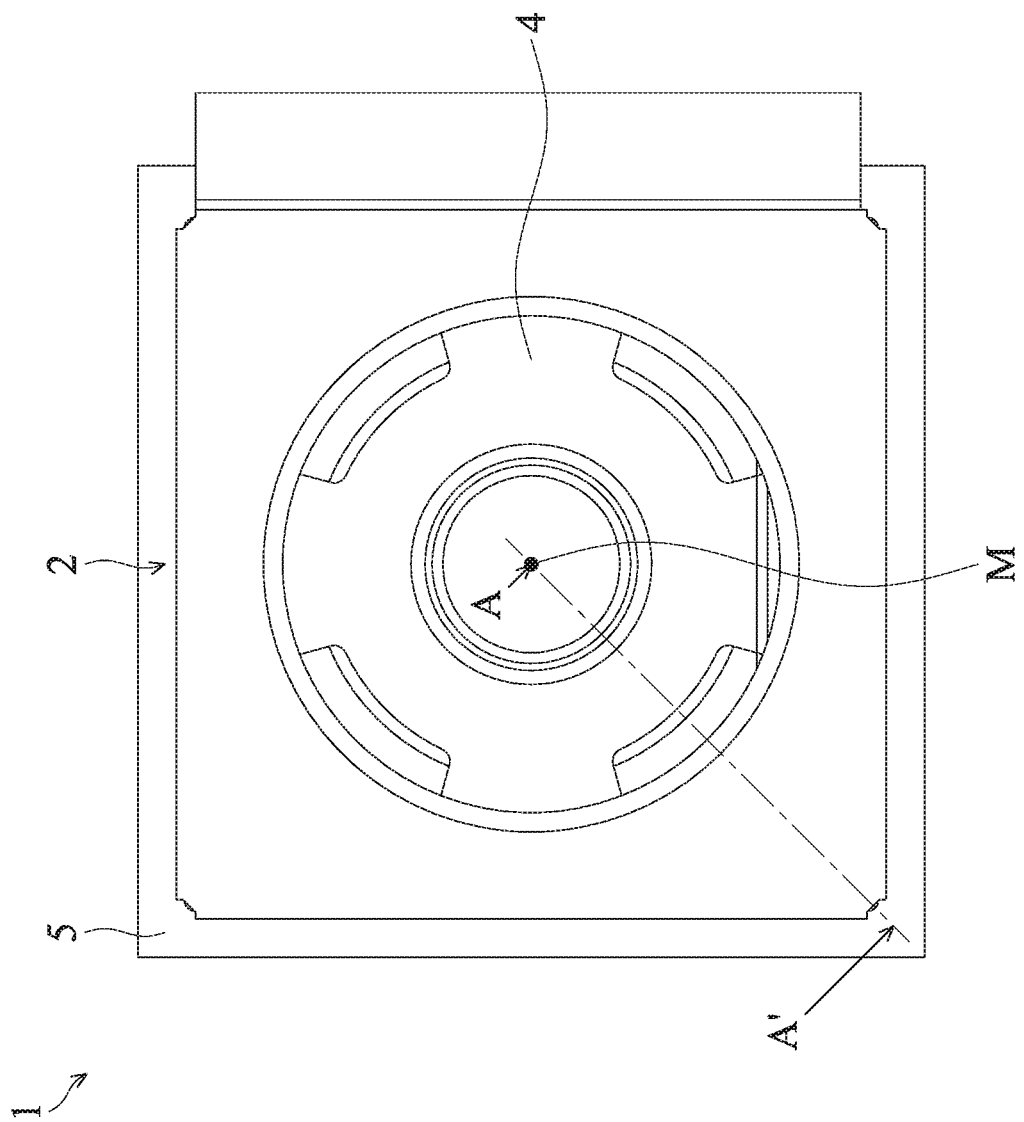
FIG. 1 shows a cross-sectional schematic view of a camera device, in accordance with some embodiments of the disclosure.

In the following detailed description, for purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept may be embodied in various forms without being limited to those exemplary embodiments. In addition, the drawings of different embodiments may use like and/or corresponding numerals to denote like and/or corresponding elements in order to clearly describe the present disclosure. However, the use of like and/or corresponding numerals in the drawings of different embodiments does not suggest any correlation between different embodiments.

It should be noted that the elements or devices in the drawings of the present disclosure may be present in any form or configuration known to those skilled in the art. In addition, the expression "a layer overlying another layer", "a layer is disposed above another layer", "a layer is disposed on another layer" and "a layer is disposed over another layer" may indicate not only that the layer directly contacts the other layer, but also that the layer does not directly contact the other layer, there being one or more intermediate layers disposed between the layer and the other layer.

In this specification, relative expressions are used. For example, "lower", "bottom", "higher" or "top" are used to describe the position of one element relative to another. It should be appreciated that if a device is flipped upside down, an element at a "lower" side will become an element at a "higher" side.

The terms "about" and "substantially" typically mean+/− 20% of the stated value, more typically +/−10% of the stated value and even more typically +/−5% of the stated value. The stated value of the present disclosure is an approximate value. When there is no specific description, the stated value includes the meaning of "about" or "substantially".

FIG. 1 shows a cross-sectional schematic view of a camera device 1, in accordance with some embodiments of the disclosure. In some embodiments, the camera device 1 includes an electromagnetic driving module 2, an optical lens assembly 4, and an optical sensor 5. The optical lens assembly 4 is disposed inside of the electromagnetic driving module 2. Light from the outside passes through the optical lens assembly 4 and projected on the optical sensor. Once the optical sensor 5 receives the light, a digital signal corresponding to the light is produced. The electromagnetic driving module 2 is configured to control the movement of the optical lens assembly 4 in multiple directions (such as the direction perpendicular to the optical axis of the optical lens assembly 4). With the control of the electromagnetic driving module 2, the light passing through the optical lens assembly 4 is deflected and projected on the optical sensor correctly, so as to improve image quality of the camera device 1.

In accordance with some embodiments of the disclosure, the structural features of the electromagnetic driving module 2 are described below.

In some embodiments, as shown in FIG. 1, the electromagnetic driving module 2 includes a housing 20, a stationary member 21, a movable member 23, a number of suspension wires 25, a focusing driving coil 31, and a number of driving magnets, such as two driving magnets 33 and two driving magnets 35. The elements of the electromagnetic driving module 2 can be added to or omitted, and the invention should not be limited by the embodiment.

In some embodiments, the housing 20 includes a front housing member 201, and a lateral housing member 202. The lateral housing member 202 extends from the edge of the front housing member 201 toward the stationary member 21 and is connected to the edge of the stationary member 21. The stationary member 21 is connected to the stationary member 21 via the lateral housing member 12 of the housing 10, so as to define a space for accommodating other elements of the electromagnetic driving module 2.

In some embodiments, the stationary member 21 includes a base 211, a circuit board 213, and a coil assembly 215. The circuit board 213 is disposed on the base 211 and is configured to receive electric signals from an external circuit and/or power source. The coil assembly 215 is disposed on the circuit board 213. In some embodiments, the coil assembly 215 includes a substrate 216, two OIS driving coils 217, and two OIS driving coils 218. The OIS driving coils 217 and 218 are electrically connected to the circuit substrate 216 and are configured to drive the movement of the movable portion 18 in a direction that is perpendicular to the main axis M. In some embodiments, as shown in FIG. 1, the two OIS driving coils 217 are respectively positioned adjacent to two lateral sides of the base 211 that are arranged along the X direction. In addition, the two OIS driving coils 218 are respectively positioned adjacent to two lateral sides of the base 211 that are arranged along the Y direction.

The movable member 23 and the stationary member 21 are spaced apart from each other and arranged along the main axis M. In some embodiments, the movable member 23 is an autofocus assembly, and includes a frame 24, a holder 25, an upper spring sheet 26, and a lower spring sheet 27. The holder 25 is surrounded by the frame 24, and a passage penetrates the holder 25 along the main axis M for receiving an element such as lens assembly 4 (FIG. 1).

Figure 3:
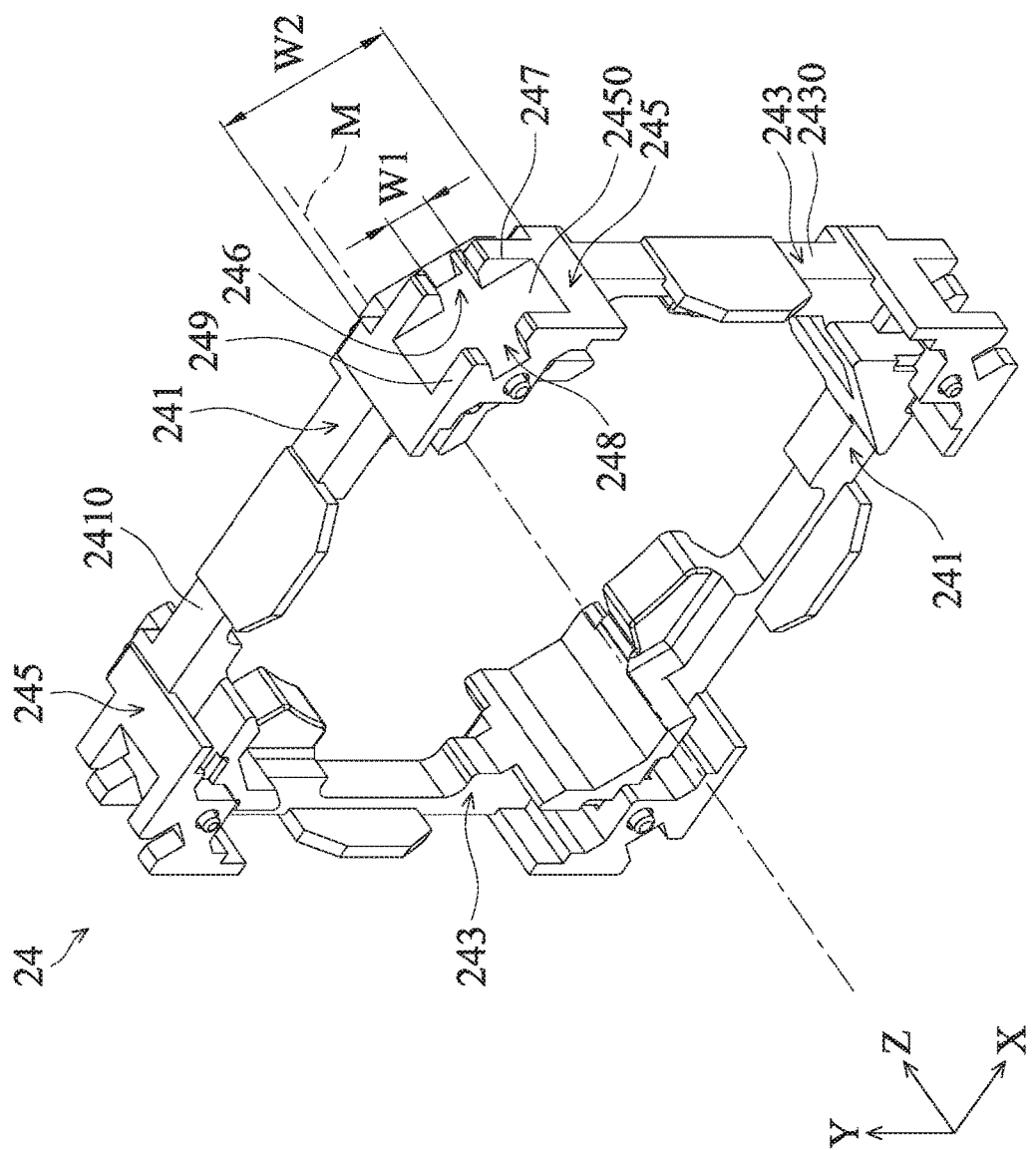
FIG. 3 shows a schematic view of a frame, in accordance with some embodiments of the disclosure.

FIG. 3 shows a schematic view of the frame 24, in accordance with some embodiments of the disclosure. In some embodiments, the frame 24 is arranged to surround the main axis M and includes two first sub-frames 241, two second sub-frames 243, and four connecting frame members 245. The two first sub-frames 241 are respectively disposed on two sides of the main axis M and disposed adjacent to two lateral edges of the base 211 in the X direction. The two second sub-frames 243 are respectively disposed on two sides of the main axis M and disposed adjacent to two lateral edges of the base 211 in the Y direction.

The connecting frame member 245 connects one of the first sub-frames 241 to the neighboring second sub-frame 243. In some embodiments, the connecting frame member 245 includes an engaging surface 2450 extending parallel to the main axis M. The plane on which the engaging surface 2450 is located forms an angle with the plane on which the outer surface 2410 of the first sub-frame 241 is located. In addition, the plane on which the engaging surface 2450 is located forms an angle with the plane on which the outer surface 2430 of the second sub-frame 243 is located. In addition, two flanges 247 and 249 protrude outwardly from the engaging surface 2450 of the connecting frame member 245. The flange 247 is disposed adjacent to the upper edge of the connecting frame member 245 (i.e., much closer to the front housing member 201), and the flange 249 is arranged adjacent to the lower edge of the connecting frame member 245 (i.e., much closer to the stationary member 21).

Two notches 246 and 248 are formed on the two respective flanges 247 and 249. A passage which allows the suspension member 29 (FIG. 1) to pass therethrough is defined at each of the two notches 246 and 248. In some embodiments, the two notches 246 and 248 are replaced by two through holes. The two through holes are respectively formed on the two flanges 247 and 249, and two passages are defined by the two through holes for allowing the suspension member 29 (FIG. 1) to pass therethrough. In some embodiments, there are fewer than four connecting frame members 245, and one or more first sub-frames 241 is directly connected to the neighboring second sub-frames 243.

Figure 2:
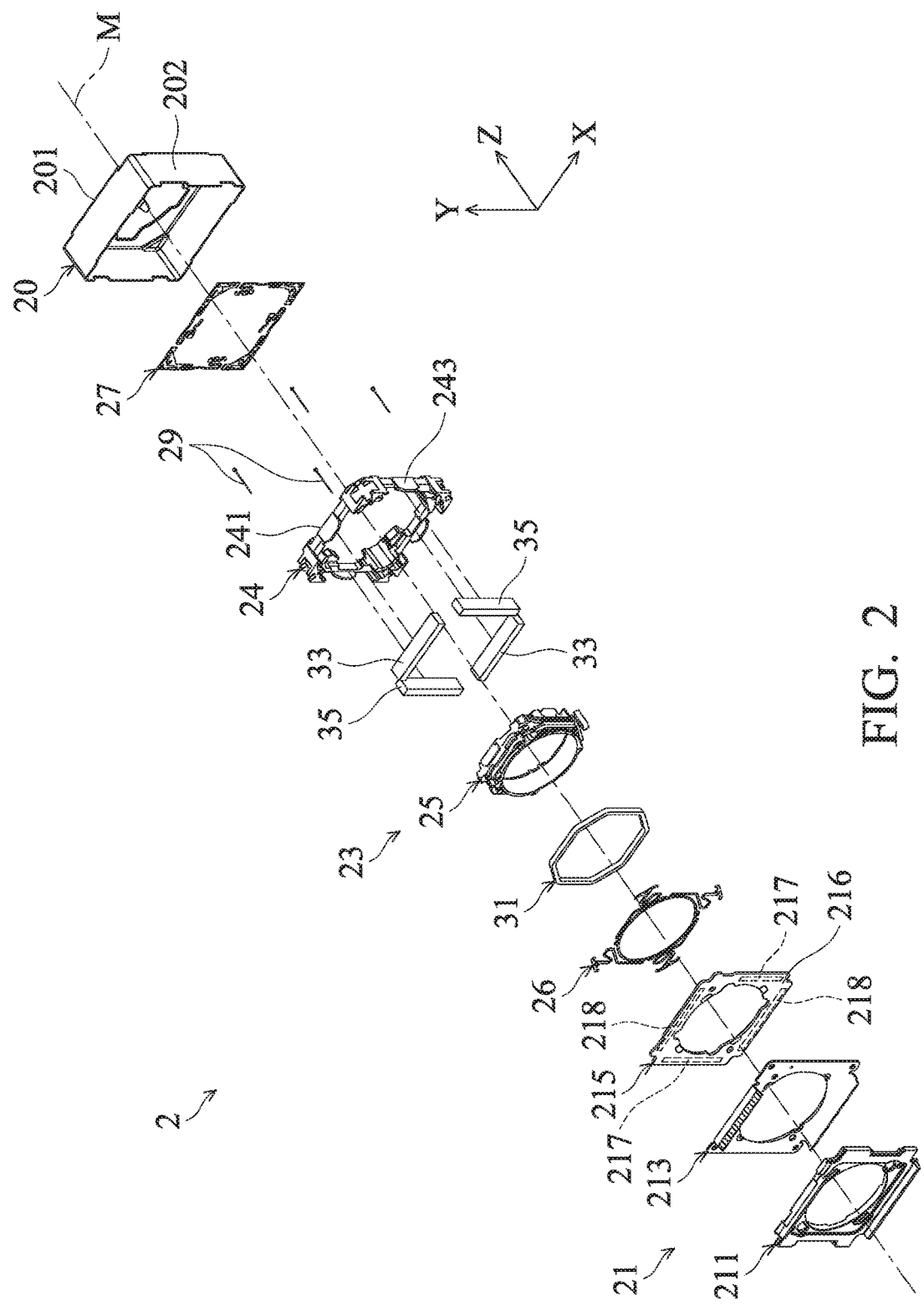
FIG. 2 shows an exploded view of an electromagnetic driving module, in accordance with some embodiments of the disclosure.

Referring to FIG. 2, the two magnets 33 are respectively disposed on the two first sub-frames 241 and face the two OIS driving coils 217. The two magnets 35 are respectively disposed on the two first sub-frames 241 and face the two OIS driving coils 218. The focusing driving coil 31 is disposed on the outer surface of the holder 25 and faces the magnets 33 and 35.

Figure 4:
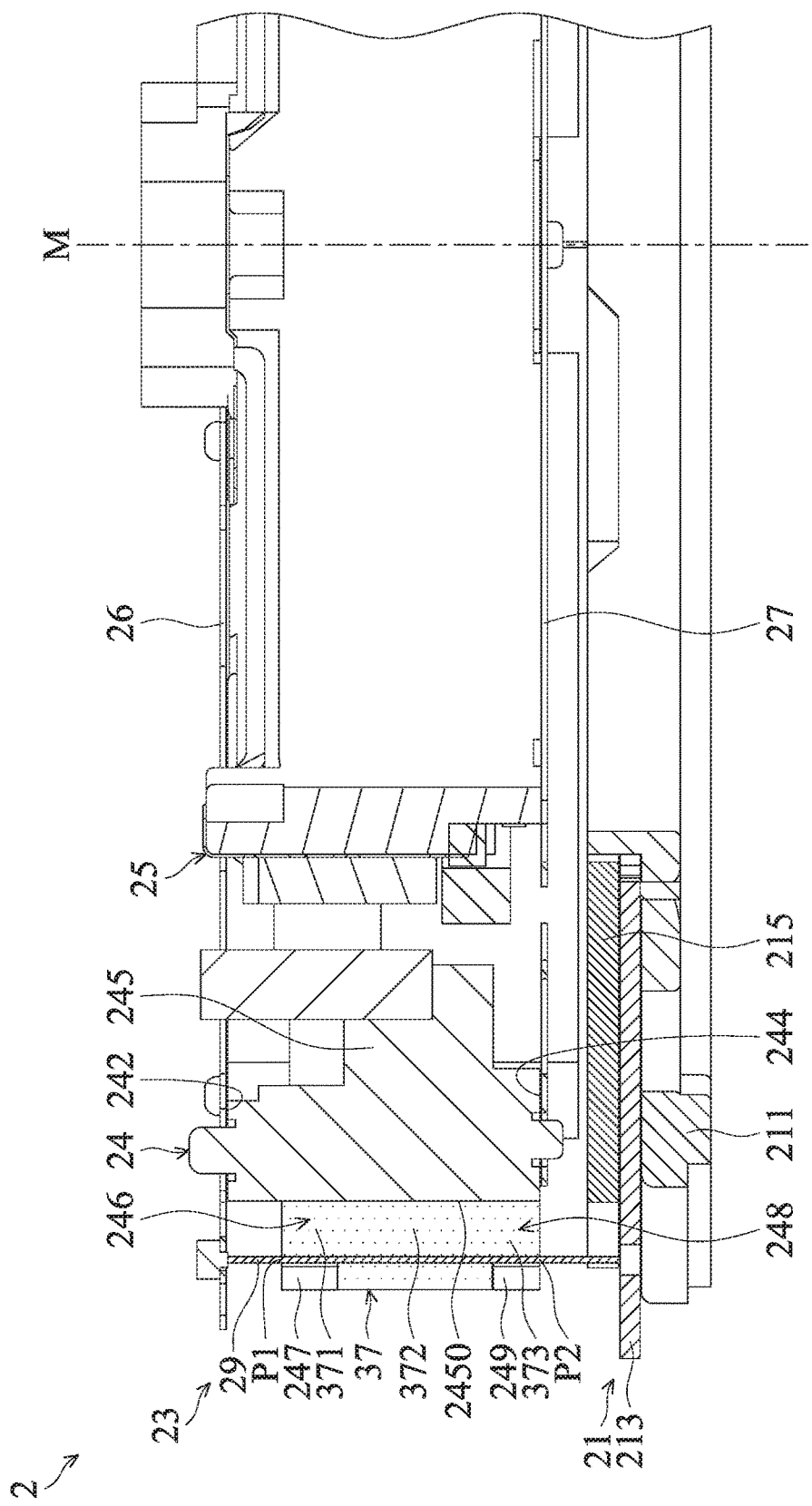
FIG. 4 shows a cross-sectional view of the electromagnetic driving module 2 taken along A-A' line of the FIG. 1.

FIG. 4 shows a cross-sectional view of the electromagnetic driving module 2 taken along A-A' line of the FIG. 1. In some embodiments, the upper spring sheet 26 and the lower spring sheet 27 are respectively fixed on the upper surface 242 and the lower surface 244 of the fame 24, and the holder 25 is disposed between the upper spring sheet 26 and the lower spring sheet 27. The upper spring sheet 26 and the lower spring sheet 27 are arranged so that the holder 25 can be driven to move relative to the stationary member 21 in a direction that is parallel to the main axis M.

The suspension member 29 is arranged such that the movable member 2 can be driven to move relative to the stationary member 21 in a direction that is perpendicular to the main axis M. In some embodiments, the electromagnetic driving module 2 includes four suspension members 29, and each suspension member 29 is disposed adjacent to the engaging surface 2450 of the connecting frame member 245 and connected between the stationary member 21 and the movable member 23. One end of the suspension member 29 is connected to the upper spring sheet 26 which is disposed on the movable member 23, and another end of the suspension member 29 is connected to the circuit board 213.

In some embodiments, at least one of the suspension members 29 is connected to the movable member 23 via the energy-absorbing glue 37. The energy-absorbing glue 37 is made of materials that include silicon mixing with other mixture. Due to its flexibility and adhesive properties, the energy-absorbing glue 37 may make the system more stable by decreasing (delaying) the resonant frequency and/or decreasing resonant amplitude during the motion of the system. For example, as shown in FIG. 4, the energy-absorbing glue 37 is applied between the two flanges 247 and 249 to connect the suspension member 29 to the engaging surface 2450 of the frame 24. In the exemplary embodiment, the segment of the suspension member 29 that is disposed between the flanges 247 and 249 is completely covered by the energy-absorbing glue 37. Thus, the energy-absorbing glue 37 not only connects the suspension member 29 to the engaging surface 2450 but it also connects the suspension member 29 to the flanges 247 and 249. Since the energy-absorbing glue 37 is connected to multiple surfaces of the frame 24, the energy-absorbing glue 37 will not easily become detached from the frame 24, and the resonance that occurs to the frame 24 is reliably restrained.

In addition, the flanges 247 and 249 defined a spaced for receiving the energy-absorbing glue 37 so that the amount of energy-absorbing glue 37 applied on the frame 24 can be controlled. As a result, the performance variation of the electromagnetic driving modules 2 due to a different amount of energy-absorbing glue 37 being applied on the frame 24 is avoided. Moreover, since the region on the suspension member 29 that is covered by the energy-absorbing glue 37 is increased, the resonance of the frame 24 is remarkably restrained.

In some embodiments, as shown in FIG. 4, in addition to the region between the flanges 247 and 249, the energy-absorbing glue 37 is disposed in notch 246 or notch 248. For example, the energy-absorbing glue 37 includes a first segment 371, a second segment 372, and a third segment 373. The first segment 371 is disposed in the notch 246, the second segment 372 is disposed between the flanges 247 and 249, and the third segment 373 is disposed in the notch 248. Each of the first, second, and third segments 371, 372 and 373 is in contact with the engaging surface 2450. In some embodiments, the shape of the energy-absorbing glue 37 is compatible with the shape of the frame 24, and thus the width of the first segment 371 and the third segment 373 in a direction that is perpendicular to the main axis M is smaller than the width of the second segment 372 that is perpendicular to the main axis M.

By applying the energy-absorbing glue 37 in the notches 246 and 248, the contact area between the energy-absorbing glue 37 and the frame 24 is increased. As a result, the adhesion strength between the energy-absorbing glue 37 and the frame 24 is improved. In addition, since the width of the energy-absorbing glue 37 is varied in neighboring segments, the energy-absorbing glue 37 has a hook-shaped configuration. Therefore, the energy-absorbing glue 37 is reliably connected to the frame 24 and not easily detached therefrom.

In some embodiments, as shown in FIG. 4, a segment of the suspension member 29 between the upper reference point P1 and the lower reference point P2 is completely covered by the energy-absorbing glue 37. The distance between the lower reference point P2 and the lower surface 244 of the frame 24 is shorter than the distance between the lower reference point P2 and the upper surface 242 of the frame 24. Since the lower reference point P2 is spaced apart from the free end of the suspension member 29 (i.e., the end connecting to the upper spring sheet 26) by a sufficient distance, the suspension member 29 has a greater moving distance, and the damping force is increased. As a result, the stability and reliability of the electromagnetic driving module 2 is improved.

It is appreciated that the configuration of the connecting frame member 245 should not be limited by the above-mentioned embodiments. The connecting frame member 245 can be modified as long as there is an engaging surface formed on the connecting frame member on which the energy-absorbing glue may be applied. Embodiments of various frames are described below.

Figure 5:
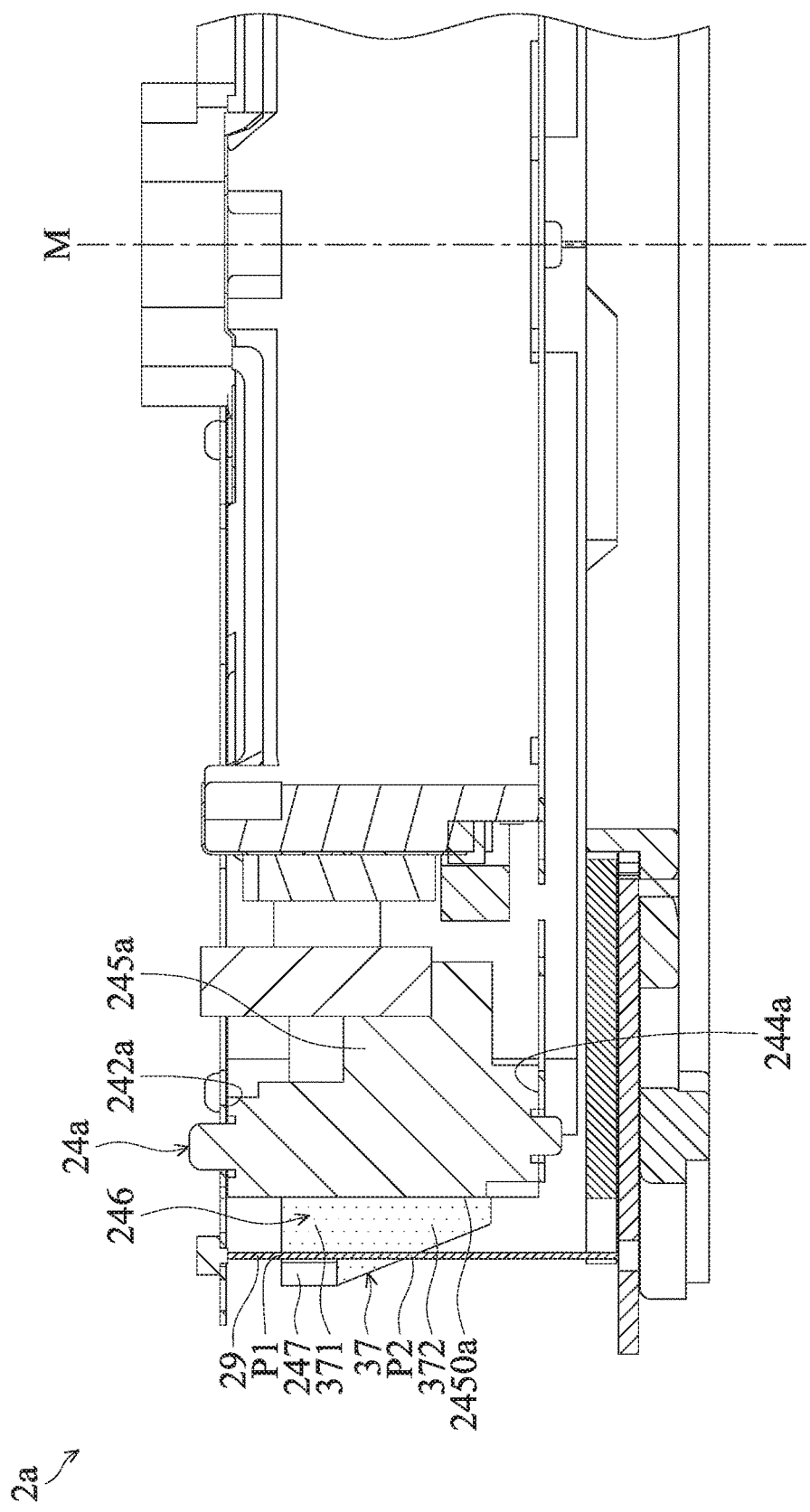
FIG. 5 shows a cross-sectional view of an electromagnetic driving module, in accordance with another embodiment.

FIG. 5 shows a cross-sectional view of an electromagnetic driving module 2a, in accordance with another embodiment. In the embodiments shown in FIG. 5, elements similar to those shown in FIGS. 1-4 are provided with the same reference numbers, and the features thereof are not reiterated in the interests of brevity. Differences between the frame 24a and the frame 24 include the absence of the flange 249 on the connecting frame member 245a of the frame 24a.

FIG. 5 shows a cross-sectional view of an electromagnetic driving module 2a, in accordance with another embodiment. In the embodiments shown in FIG. 5, elements similar to those shown in FIGS. 1-4 are provided with the same reference numbers, and the features thereof are not reiterated in the interests of brevity. Differences between the frame 24a and the frame 24 include the absence of the flange 249 on the connecting frame member 245a of the frame 24a.

In some embodiments, the first segment 371 of the energy-absorbing glue 37 is disposed in the notch 246 of the flange 247, and the second segment 372 of the energy-absorbing glue 37 is disposed between the flange 247 and the lower surface of the frame 24a. In a direction perpendicular to the main axis M, the width of the first segment 371 is smaller than the width of the second segment 372.

Figure 6:
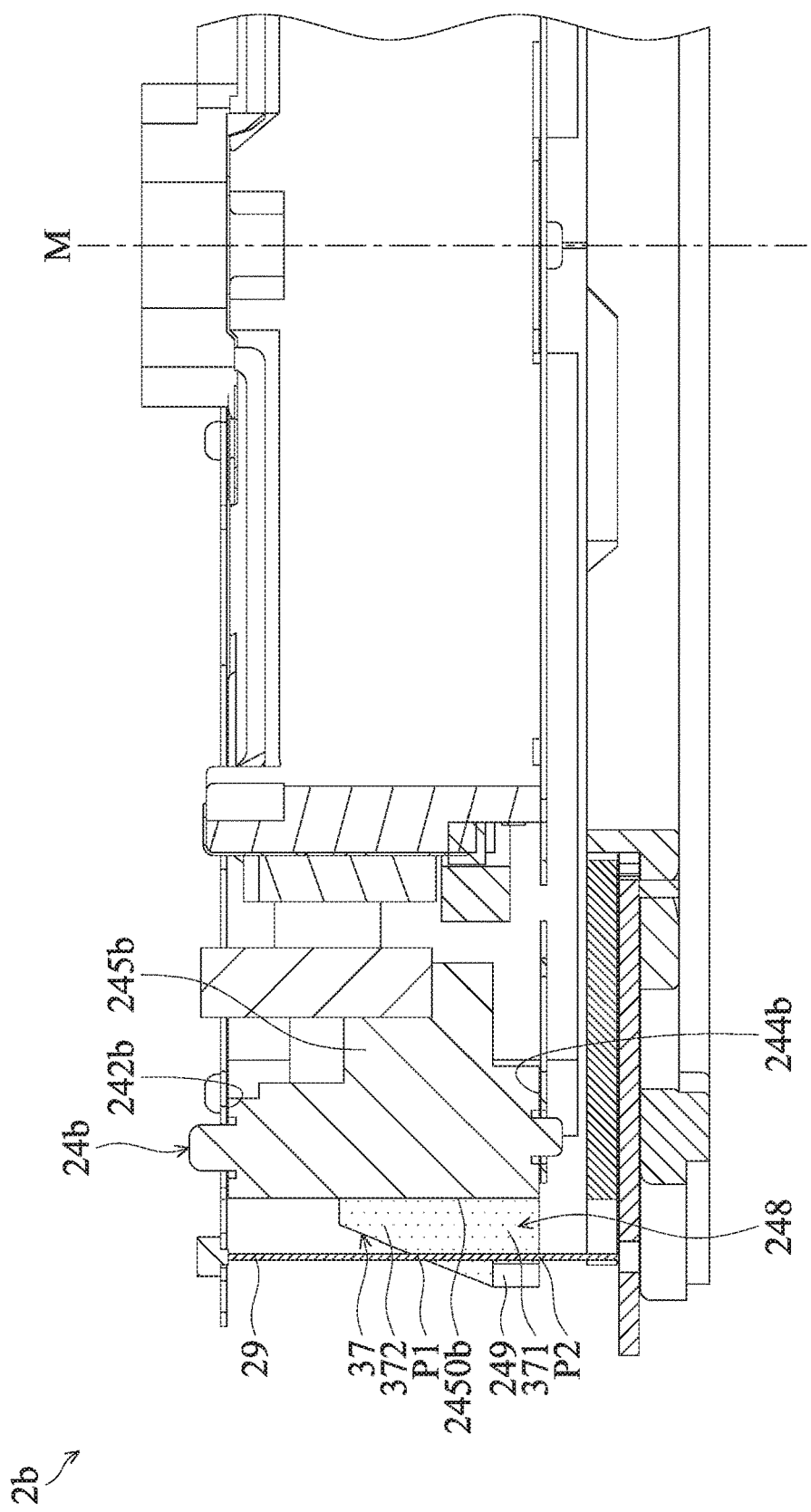
FIG. 6 shows a cross-sectional view of an electromagnetic driving module, in accordance with another embodiment.

FIG. 6 shows a cross-sectional view of an electromagnetic driving module 2b, in accordance with another embodiment. In the embodiments shown in FIG. 6, elements similar to those shown in FIGS. 1-4 are provided with the same reference numbers, and the features thereof are not reiterated in the interests of brevity. Differences between the frame 24b and the frame 24 include the absence of the flange 247 on the connecting frame member 245a of the frame 24a.

In some embodiments, the energy-absorbing glue 37 is applied between the engaging surface 2450b of the frame 24b and the flange 249 so as to connect the suspension member 29 to the engaging surface 2450b and the flange 247. Since the energy-absorbing glue 37 is connected to multiple surfaces of the frame 24b, the energy-absorbing glue 37 will not detach easily from the frame 24b, and the resonance that occurs to the frame 24b is reliably restrained. In addition, as shown in FIG. 6, a segment of the suspension member 29 between the upper reference point P1 and the lower reference point P2 is completely covered by the energy-absorbing glue 37. Since the distance between the lower reference point P2 and the lower surface 244b of the frame 24b is shorter than the distance between the lower reference point P2 and the upper surface 242b of the frame 24b, a greater damping force will be generated as the suspension member 29 is moved relative to the frame 24b.

In some embodiments, the first segment 371 of the energy-absorbing glue 37 is disposed in the notch 248 of the flange 249, and the second segment 372 of the energy-absorbing glue 37 is disposed between the flange 247 and the lower surface of the frame 24a. In a direction perpendicular to the main axis M, the width of the first segment 371 is smaller than the width of the second segment 372.

Figure 7:
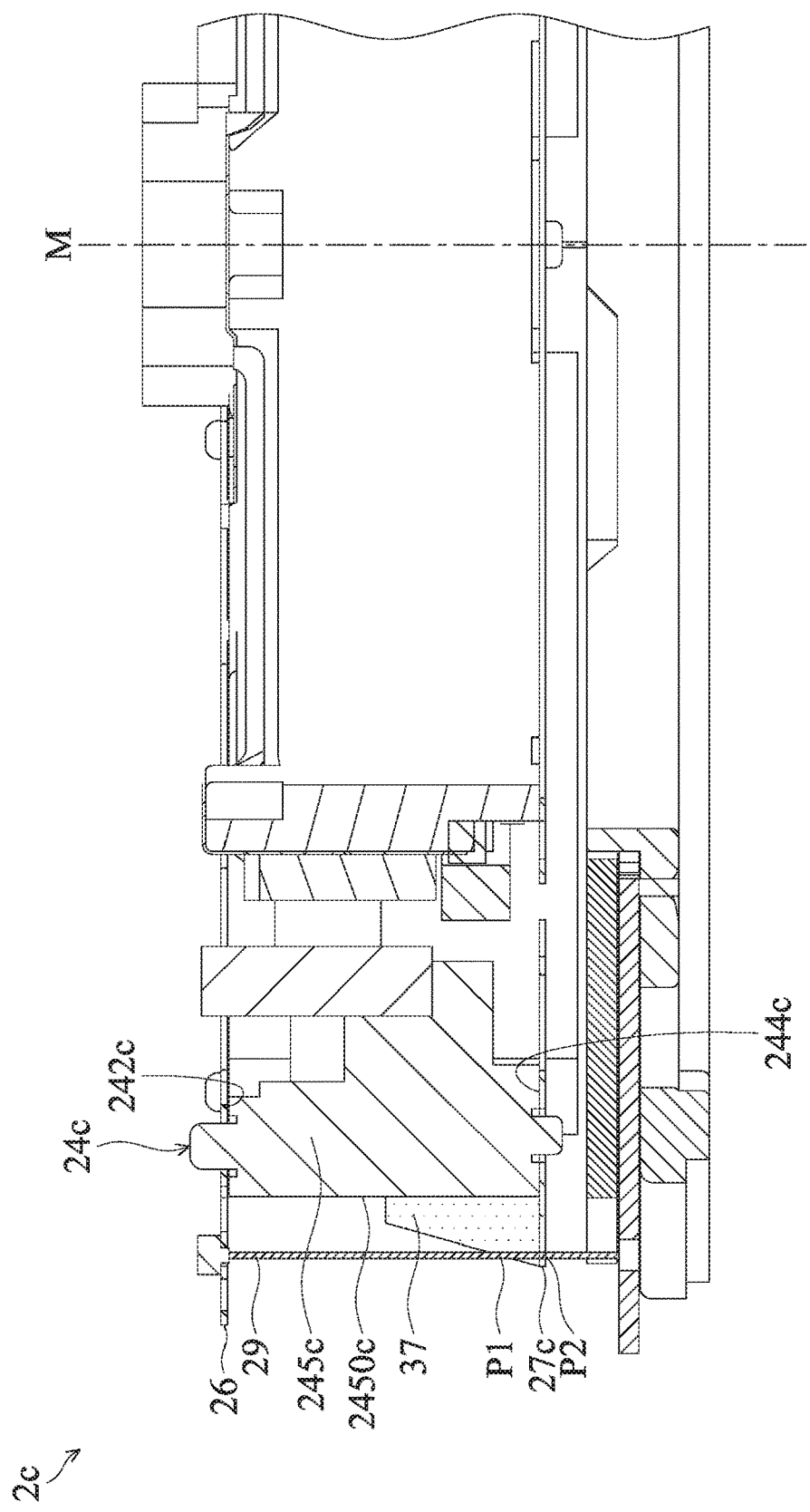
FIG. 7 shows a cross-sectional view of an electromagnetic driving module, in accordance with another embodiment.

FIG. 7 shows a cross-sectional view of an electromagnetic driving module 2c, in accordance with another embodiment. In the embodiments shown in FIG. 7, elements similar to those shown in FIGS. 1-4 are provided with the same reference numbers, and the features thereof are not reiterated in the interests of brevity. Differences between the frame 24c and the frame 24 include the absence of the flanges 247 and 249 on the connecting frame member 245c of the frame 24c and the lower spring sheet 27c extending across the outer edge of the frame 24c.

In some embodiments, the energy-absorbing glue 37 is applied between the lower spring sheet 27c and the engaging surface 2450c of the frame 24c so as to connect the suspension member 29 to the engaging surface 2450c and the lower spring sheet 27c. Since the energy-absorbing glue 37 is connected to multiple surfaces of the frame 24c and the lower spring sheet 27c, the energy-absorbing glue 37 will not easily become detached from the frame 24c, and the resonance that occurs to the frame 24c is reliably restrained. In addition, as shown in FIG. 7, a segment of the suspension member 29 between the upper reference point P1 and the lower reference point P2 is completely covered by the energy-absorbing glue 37. Since the distance between the lower reference point P2 and the lower surface 244c of the frame 24c is shorter than the distance between the lower reference point P2 and the upper surface 242c of the frame 24c, a greater damping force will be generated as the suspension member 29 is moved relative to the frame 24c.

Figure 8:
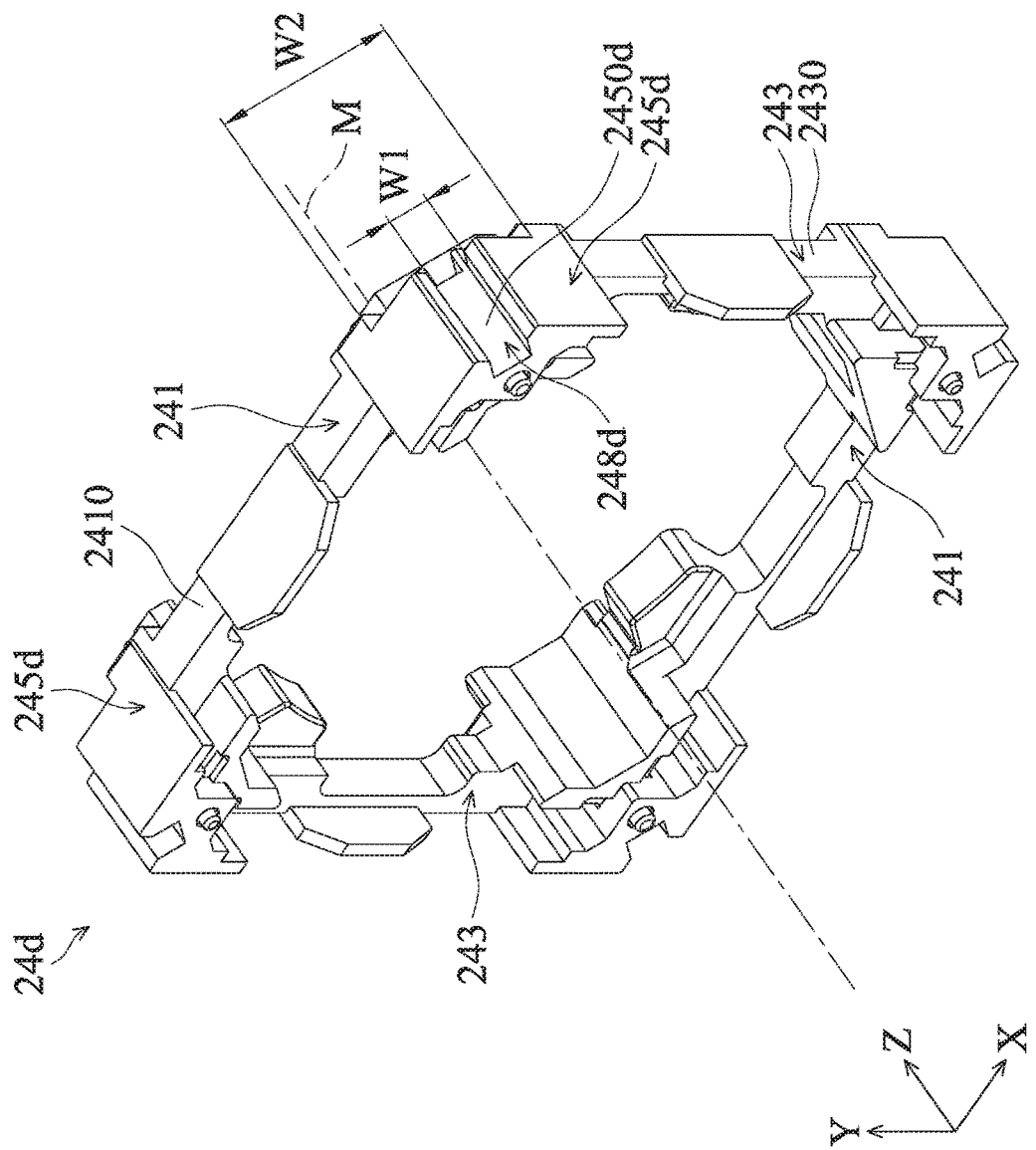
FIG. 8 shows a schematic view of a frame, in accordance with another embodiment.
Figure 9:
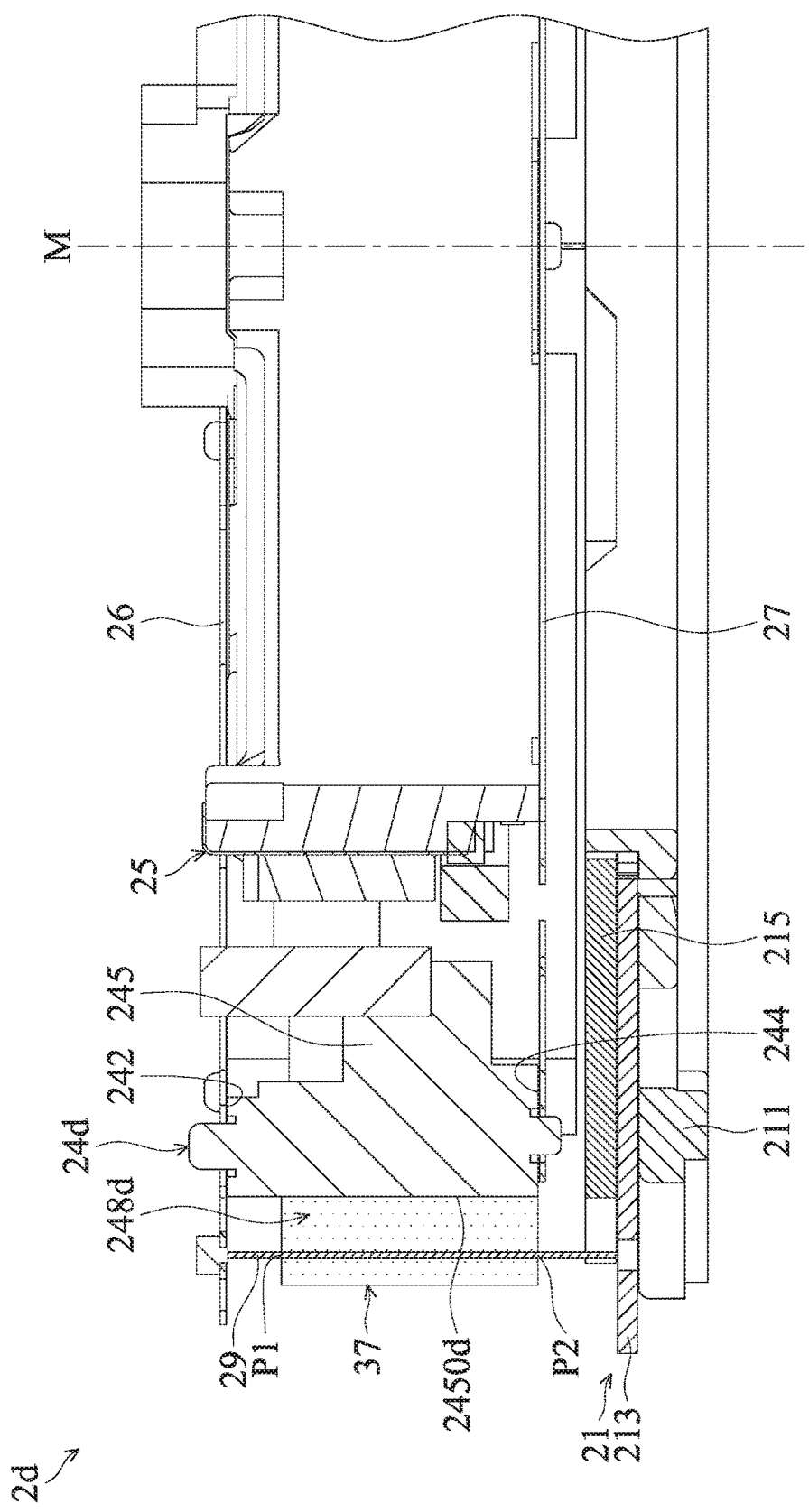
FIG. 9 shows a cross-sectional view of an electromagnetic driving module, in accordance with another embodiment.

FIG. 8 shows a schematic view of a frame 24d, and FIG. 9 shows a cross-sectional view of an electromagnetic driving module 2d, in accordance with another embodiment. In the embodiments shown in FIGS. 8 and 9, elements similar to those shown in FIGS. 1-4 are provided with the same reference numbers, and the features thereof are not reiterated in the interests of brevity. Differences between the frame 24d and the frame 24 include a recess 248d extending parallel to the main axis M being formed on the connecting frame member 245d of the frame 24d to define a passage for the suspension member 29 (FIG. 1) passing therethrough.

In some embodiments, as shown in FIG. 9, the energy-absorbing glue 37 is applied in the recess 248d so as to connect suspension member 29 to the engaging surface 2450d of the frame 24d. In some embodiments, the recess 248d has a uniform width, the energy-absorbing glue 37 applied in the recess 248d has a shape that is compatible to the shape of the recess 248d and has the same width as that of the recess 248d. In addition, a segment of the suspension member 29 between the upper reference point P1 and the lower reference point P2 is completely covered by the energy-absorbing glue 37. Since the distance between the lower reference point P2 and the lower surface 244d of the frame 24d is shorter than the distance between the lower reference point P2 and the upper surface 242d of the frame 24d, a greater damping force will be generated as the suspension member 29 is moved relative to the frame 24d.

It should be appreciated that, while in the above-mentioned embodiments, the movable member is an auto-focus assembly, the disclosure should not be limited thereto. In some other embodiments, the movable member is a holder for supporting an element, such as the lens assembly. Four magnets are disposed on the holder and face the OIS driving coils, and the suspension member connects the holder to the stationary member.

Embodiments of the electromagnetic driving module use the energy-absorbing glue to connect the suspension member to the movable member. As a result, the electromagnetic driving module has improved stability and reliability even if vibrations happen. In addition, compared with the energy-absorbing glue in the conventional device which is applied directly between the stationary member and the movable member, the energy-absorbing glue of the disclosure is more durable. And thus fracturing of energy-absorbing glue due to a shearing force or a tensile force as a drawing force is applied can be prevented or avoided.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An electromagnetic driving assembly, comprising:
a movable member, comprising an upper spring sheet;
a stationary member, wherein the movable member and the stationary member are arranged along a main axis, and the movable member comprises an engaging surface parallel to the main axis;
a suspension member, extending in a direction that is parallel to the main axis, wherein two ends of the suspension member are respectively connected to the movable member and the stationary member, so as to enable the movable member to be suspended over the stationary member, wherein the suspension member is connected to the upper spring sheet; and
an energy-absorbing glue, wherein a segment of the suspension member is covered in the energy-absorbing glue, and the energy-absorbing glue connects the suspension member to the engaging surface, wherein a gap is formed between the energy-absorbing glue and the upper spring sheet.

2. The electromagnetic driving assembly as claimed in claim 1, wherein the movable member further comprises at least one flange formed on the engaging surface, and the energy-absorbing glue connects the suspension member to the flange.

3. The electromagnetic driving assembly as claimed in claim 2, wherein the flange extends along a direction that is perpendicular to the main axis, and a passage is defined by the flange to allow the suspension member to pass therethrough, wherein a portion of the energy-absorbing glue is disposed in the passage.

4. The electromagnetic driving assembly as claimed in claim 1, wherein the movable member comprises two flanges formed on the engaging surface, the energy-absorbing glue is located between the two flanges and connects the suspension member to the two flanges.

5. The electromagnetic driving assembly as claimed in claim 1, wherein the energy-absorbing glue has a first segment and a second segment, and the movable member has an upper surface and a lower surface which are perpendicular to the main axis, wherein the second segment is closer to the upper surface or the lower surface than the first segment, and the width of the second segment is smaller than the width of the first segment.

6. The electromagnetic driving assembly as claimed in claim 1, wherein the energy-absorbing glue has a uniform width along a direction that is perpendicular to the main axis.

7. The electromagnetic driving assembly as claimed in claim 1, wherein the movable member is an auto-focusing assembly and comprises:
a frame, surrounding the main axis, wherein the engaging surface is located at a side of the frame that is away from the main axis;
a holder, surrounded by the frame;
a focusing driving coil, disposed on the outer surface of the holder that faces the frame; and
a magnet, disposed on the frame and facing the focusing driving coil.

8. The electromagnetic driving assembly as claimed in claim 7, wherein the frame comprises:
a plurality of lateral frame members; and
a plurality of connecting frame members, each connecting two neighboring lateral frame members, wherein the engaging surface is located on one of the lateral frame members, and the engaging surface forms an angle with the extending direction of the neighboring lateral frame member.

9. The electromagnetic driving assembly as claimed in claim 1, further comprising:
an OIS driving coil, disposed on the stationary member; and
a magnet, disposed on the movable member and facing the OIS driving coil, wherein when an electrical current is applied to the OIS driving coil, the movable member is driven to move in a direction that is perpendicular to the main axis by the magnetic force produced by the OIS driving coil and the magnet.

10. The electromagnetic driving assembly as claimed in claim 1, wherein the suspension member has an upper reference point and a lower reference point, a segment of the suspension member between the upper reference point and the lower reference point is covered by the energy-absorbing glue,
wherein a distance between the lower reference point and a lower surface of the movable member is shorter than a distance between the lower reference point and an upper surface of the movable member.

11. The electromagnetic driving assembly as claimed in claim 1, wherein the suspension member has an upper reference point and a lower reference point, a segment of the suspension member between the upper reference point and the lower reference point is covered by the energy-absorbing glue,
wherein a distance between the lower reference point and a lower surface of the movable member is greater than a distance between the lower reference point and an upper surface of the movable member, and the upper reference point is distant from a position at which the movable member is connected to the suspension member.

12. A camera device, comprising:
a movable member, comprising an upper spring sheet;
a stationary member, wherein the movable member and the stationary member are arranged along a main axis, and the movable member comprises an engaging surface parallel to the main axis;
a suspension member, extending in a direction that is parallel to the main axis, wherein two ends of the suspension member are respectively connected to the movable member and the stationary member, so as to enable the movable member to be suspended over the stationary member, wherein the suspension member is connected to the upper spring sheet;

an energy-absorbing glue, wherein a segment of the suspension member is covered in the energy-absorbing glue, and the energy-absorbing glue connects the suspension member to the engaging surface, wherein a gap is formed between the energy-absorbing glue and the upper spring sheet; and a lens assembly positioned in the movable member, wherein an optical axis of the lens assembly is aligned with the main axis.

* * * * *